United States Patent [19]
Diana et al.

[11] 3,897,458
[45] July 29, 1975

[54] ARYLALKENYL NITRILES AND FUNCTIONAL DERIVATIVES THEREOF

[75] Inventors: Guy D. Diana, Stephentown; William B. Hinshaw, Jr., Sand Lake, both of N.Y.

[73] Assignee: Sterling Drug Inc., New York, N.Y.

[22] Filed: Jan. 17, 1973

[21] Appl. No.: 324,340

[52] U.S. Cl. ............. 260/340.5; 260/398; 260/404; 260/408; 260/465 F; 260/465 G; 260/465 K; 260/558 R; 260/558 D; 260/559 R; 260/570.5 R; 260/612 R; 260/613 R; 260/618 R; 260/618 D; 260/649 R; 260/649 F; 424/282; 424/304; 424/308; 424/324; 424/330
[51] Int. Cl.$^2$ ...................................... C07D 317/06
[58] Field of Search ................................ 260/340.5

[56] References Cited
OTHER PUBLICATIONS
Ansell et al. Chem. Abstracts, Vol. 53 (1959), pp. 9170–9171.

*Primary Examiner*—James A. Patten
*Attorney, Agent, or Firm*—Thomas L. Johnson; B. Woodrow Wyatt

[57] ABSTRACT

Compounds useful as insecticides are prepared from intermediates of the formula $ICH_2CH_2C(R)=CHCH_2CH_2Ar$ where R is lower-alkyl and Ar is phenyl or substituted phenyl. The iodide is treated with cyanide ion to produce the corresponding nitrile. The nitrile is subsequently converted to the corresponding carboxyl (HOOC), amide ($H_2NCO$) and amine ($H_2NCH_2$) compounds.

7 Claims, No Drawings

ARYLALKENYL NITRILES AND FUNCTIONAL DERIVATIVES THEREOF

This invention relates to arylakenyl nitriles and compounds wherein the nitrile function has been converted to other functional groups, as well as to the preparation of these compounds.

The compounds of the invention are of the structural formula

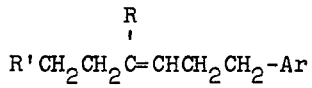

I wherein R is lower-alkyl of 1 to 4 carbon atoms; R' is a member of the group consisting of N≡C—, HOOC—, H₂NCO—, H₂NCH₂—and Ar'CONHCH₂—; and Ar and Ar' are phenyl or phenyl substituted by 3,4-methylenedioxy or one or two monovalent substituents selected from the group consisting of lower-alkyl of 1 to 4 carbon atoms, lower-alkoxy of 1 to 4 carbon atoms, halogen, trifluoromethyl and trifluoromethoxy.

The carbon chains of R and the Ar and Ar' substituents can be straight or branched, although primary or secondary alkyl moieties are preferred.

When two monovalent substituents are present on the phenyl ring of Ar, they can be the same or different.

Intermediates for the compounds of the invention are prepared as described in the following reaction sequence.

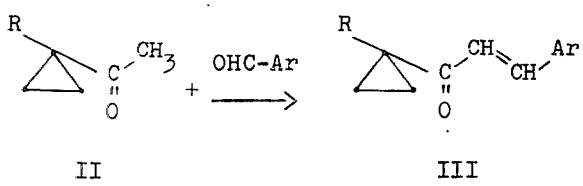

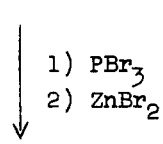

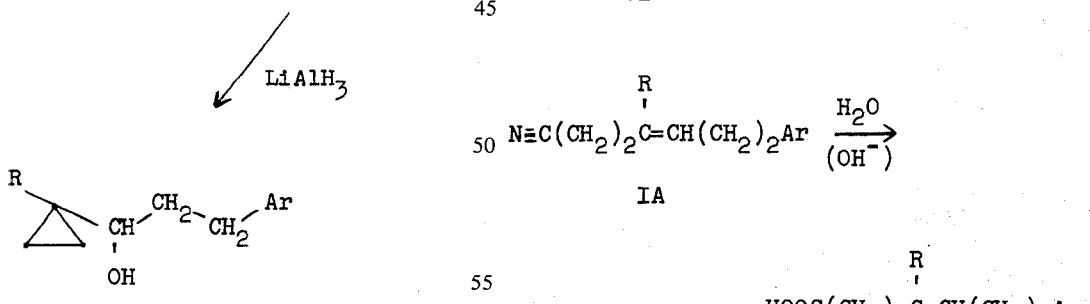

In the foregoing reaction sequence, a 1-R-1-acetyl-cyclopropane of formula II, where R has the meaning given hereinabove, is treated with an aldehyde ArCHO in the presence of a base to give the arylvinyl 1-R-cyclopropyl ketone of formula III. The latter, when treated with lithium aluminum hydride is reduced both the carbonyl group and the olefinic linkage to give an arylethyl 1-R-cyclopropyl carbinol of formula IV. This carbinol is then treated with phosphorus tribromide in the presence of a metal bromide such as lithium bromide to replace the hydroxy group by bromine, which product is then treated with zinc bromide to effect ring opening to form an arylakenyl bromide of formula V. The latter with a metallic iodide is converted to the corresponding iodide of formula VI.

The compounds of formula I are prepared as follows:

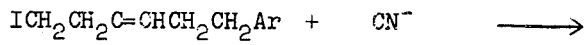

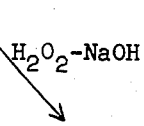

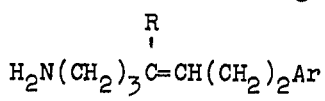

ID

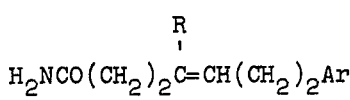

IC

| Ar'COCl

↓

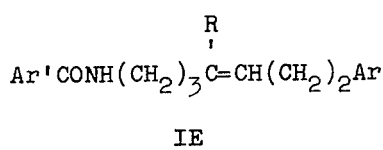

IE

The intermediate arylakenyl iodide (VI) is treated with cyanide ion, preferably derived from the readily available sodium or potassium cyanide, whereby the iodide atom is replaced by cyano to give the arylakenyl nitrile (IA). The reaction takes place in an inert organic or aqueous-organic solvent at a temperature between about 40° and 100°C.

HYdrolysis of the arylakenyl nitrile (IA) can be effected by heating it with a strong base, such as sodium or potassium hydroxide in aqueous-organic medium at a temperature between about 50° and 100°C., conveniently at the reflux tempertaure of the mixture. The reaction yield the arylalkenoic acid (IB) and proceeds by way of the amide (IC) as an intermediate.

The arylakanoic acid amide (IC) is preferably obtained by heating the nitrile (IA) with a strong base, such as sodium or potassium hydroxide, in loweralkanol solution in the presence of hydrogen peroxide at a temperature between about 40° and 60°C.

Reduction of the nitrile (IA) to the arylakenylamine (ID) is accomplished by treating the nitrile with a sodium borohydride-transition metal salt complex. The reaction takes place in an inert solvent such as a loweralkanol at ambient temperature or below. The sodium borohydride-transition metal salt complex is formed by mixing sodium borohydride with M salt, where M is a transition metal such as cobalt, nickel, osmium, iridium, platinum, or the like, the salt being a halide or other salt having an inert anion. A preferred transition metal salt is cobaltous chloride.

The arylakenylamine (ID) can the be acylated by treating it with an aroyl chloride (Ar'COCl) in the presence of an inorganic base or an organic amine. The reaction takes place at ambient temperature and yields the acylated amine of formula IE.

Biological evaluation of the compounds of the invention of formulas IA, IB and IE has shown that they possess pesticidal activity against arthropod species, as indicated by tests under simulated field conditions in a greenhouse against one or more of the following pest species: yellow mealworm pupae, dock beetle larvae, yellow fever mosquito larvae, rhodnius prolixus nymph, dock beetle eggs and two-spotted mite eggs.

The compounds of formula IC possess antiviral activity as indicated by tests in vitro against equine rhino virus, determined by standard serial dilution procedures.

The structures of the compounds of the invention were established by the modes of synthesis, by elementary analysis, and by infrared and nuclear magnetic resonance spectral determinations.

A further aspect of the invention relates to compositions for combatting arthropods by hindering the maturation thereof which comprise an effective amount of at least one compound of formula I in admixture with a suitable carrier or diluent, and to the method of combatting arthropods at any stage of their development by contacting them with said compositions.

The compositions of the invention are effective against insects at any stage of their development short of the final adult form, i.e. at the egg, larval or pupal stages. The compounds can be formulated in conventional manner as solutions, emulsions, suspensions, dusts and aerosol sprays. The pesticide compositions of the invention can contain adjuvants found normally in such preparations, including water and/or organic solvents such as acetone, dimethylformamide, sesame oil, petroleum oils, and the like. Emulsifying and surface active agents may also be added. Dust formulations can contain talc, diatomaceous earth, kaolin, bentonite, calcium carbonate, wood, flour, cork, carbon, and the like. The aerosol sprays contain propellants such as dichlorodifluoromethane. The compounds of this invention can be employed as the sole pesticide component or they can be used in admixture with other compounds having similar utility. While the concentration of active ingredient can vary within rather wide limits, ordinarily the pesticide will comprise not more than about 10%, and preferably about 1% by weight of the composition.

A still further aspect of the invention relates to compositions for combatting viruses which comprise an antivirally effective amount of at least one compound of formula I in admixture with a suitable carrier or diluent, and to the method of combatting viruses by contacting the locus of said viruses with said compositions.

The antiviral compositions are formulated by preparing a dilute solution or suspension in an organic or aqueous-organic medium, for example ethyl alcohol, acetone, dimethylsulfoxide, and the like; and are applied to the locus to be disinfected by conventional means such as spraying, swabbing or immersing. Alternatively, the compounds can be formulated as ointments or creams by incorporating them in conventional ointment or cream bases, such as alkylpolyether alcohols, cetyl alcohol, stearyl alcohol and the like; as jellies by incorporating them in conventional jelly bases such as glycerin and tragacanth; or as aerosol sprays or foams.

The following examples will further illustrate the invention.

PREPARATION OF INTERMEDIATES

A. 2-Arylvinyl cyclopropyl ketones (III)

A1. 2-3,4-Methylenedioxyphenyl)vinyl 1-ethylcyclopropyl ketone [III; Ar is 3,4-methylenedioxyphenyl, R is $C_2H_5$]

A mixture of 33.6 g. (0.3 mole) of 1-ethylcyclopropyl methyl ketone and 45 g. (0.3 mole) of piperonal in 21 ml. of ethanol was stirred at room temperature, and 21 ml. of 20% aqueous sodium hydroxide was added dropwise over a period of 30–45 minutes. The mixture was warmed at 40°–60°C. for three hours with stirring. The solution was then cooled to 0°–10°C., 0.2 ml. of glacial acetic acid added, and the mixture was extracted with ether. The ether extracts were concentrated, and the residue dissolved in 200 ml. of 95% ethanol, which solution when cooled caused separation of a solid product. The latter was recrystallized from 150 ml. of methanol to give 39 g. of 2-(3,4-methylenedioxyphenyl)vinyl 1-ethylcyclopropyl ketone, m.p. 62°–64°C.

A2. 2-(3,4-Methylenedioxyphenyl)vinyl 1-methylcyclopropyl ketone [III; Ar is 3,4-methylenedioxyphenyl, R is $CH_3$] was prepared from 25.6 g. of 1-methylcyclopropyl methyl ketone and 39.3 g. of g. of piperonal according to the procedure described above in Preparation A1, affording 29.5 g. of crystalline product.

A3. 2-(3,4-Dimethoxyphenyl)vinyl 1-ethylcyclopropyl ketone [III: Ar is 3,4-$(CH_3O)_2C_6H_3$, R is $C_2H_5$] was prepared from 22.4 g. of 1-ethylcyclopropyl methyl ketone and 33.2 g. of veratraldehyde according to the procedure described above in Preparation A1, affording 20.3 g., b.p. 156°–158°C. (0.02 mm.).

By following the procedure of Preparation A1 above, 1-isopropylcyclopropyl methyl ketone or 1-butylcyclopropyl methyl ketone can be caused to react with piperonal to give 2-(3,4-methylenedioxyphenyl)vinyl 1-isopropylcyclopropyl ketone [III; Ar is 3,4-methylenedioxyphenyl, R is $(Ch_3)_2$ CH], or 2-3,4-methylenedioxyphenyl)vinyl 1-butylcyclopropyl ketone [III; Ar is 3,4-methylenedioxyphenyl, R is $CH_3CH_2CH_2CH_2$], respectively.

By following the procedure of Preparation A1 above, 1-ethylcyclopropyl methyl ketone can be caused be react with 4-chlorobenzaldehyde, p-tolualdehyde, 3,4-dichlorobenzaldehyde, 2,4 -dichlorobenzaldehyde, 4-bromobenzaidehyde, 4-fluorobenzaldehyde, 4-trifluoromethoxybenzaldehyde or 4-trifluoromethylbenzaldehyde to give, respectively, 2-(4-chlorophenyl)vinyl 1-ethylcyclopropyl ketone [III; Ar is 4-$ClC_6H_4$, R is $C_2H_5$], 2-(p-tolyl)vinyl 1-ethylcyclopropyl ketone [III; Ar is 4-$CH_3C_6H_4$, R is $C_2H_5$], 2-(3,4-dichlorophenyl)vinyl 1-ethylcyclopropyl ketone [III; Ar is 3,4-$Cl_2C_6H_3$, R is $C_2H_5$], 2-(2,4-dichlorophenyl)vinyl 1-ethylcyclopropyl ketone [III; Ar is 2,4-$Cl_2C_6H_3$, R is $C_2 2H_5$], 2-(4-bromophenyl)vinyl 1-ethylcyclopropyl ketone [III; Ar is 4-$BrC_6H_4$, R is $C_2H_5$], 2-(4-fluorophenyl)vinyl 1-ethylcyclopropyl ketone [III; Ar is 4-$FC_6$ $H_4$, R is $C_2H_5$], 2-(4-trifluoromethoxyphenyl)vinyl 1-ethylcyclopropyl ketone [III; Ar is 4-$F_3COC_6H_4$, R is $C_2H_5$], or 2(4-trifluoromethylphenyl)vinyl 1-ethylcyclopropyl ketone [III; Ar is 4-$F_3CC_6H_4$, R is H].

B. 2-Arylethyl cyclopropyl carbinols (IV)

B1. 2-(3,4-Methylenedioxyphenyl)ethyl R is C1-ethylecyclopropyl carbinol [IV; Ar is 3,4-methylenedioxyphenyl, R is $C_2H_5$].

A suspension of 15 g. of lithium aluminum hydride in about 500 ml. of tetrahydrofuran was heated at reflux while a solution of 60 g. of 2-(3,4-methylenedioxyphenyl)vinyl 1-ethylcyclopropyl ketone (Preparation A1) in 150 ml. of tetrahydrofuran was added dropwise over a period of 2–3 hours. The reaction mixture was heated at reflux for 2 hours, cooled, and then water was added very cautiously. Excess anhydrous sodium sulfate was added, the mixture filtered, and the filter cake washed several times with chloroform. The combined filtrate and washings were evaporated to dryness to give 53 g. of an oil consisting of 2-(3,4-methylenedioxyphenyl)ethyl 1-ethylcyclopropyl carbinol.

B2. 2-(3,4-Methylenedioxyphenyl)ethyl 1-methylcyclopropyl carbinol [IV; Ar is 3,4-methylenedioxyphenyl, R is $CH_3$]was prepared from 23.4 g. of 2-(3,4-methylenedioxyphenyl)vinyl 1-methylcyclopropyl ketone (Preparation A2) and 3.88 g. of lithium aluminum hydride according to the procedure described above in Preparation B1, affording 18.8 g., b.p. 120°–130°C. (0.003 mm.).

B3. 2-(3,4-Dimethoxyphenyl)ethyl 1-ethylcyclopropyl carbinol [IV; Ar is 3,4-$(CH_3O)_2C_6H_3$, R is $C_2H_5$]was prepared from 15 g. of 2-(3,4-dimethoxyphenyl)vinyl 1-ethylcyclopropyl ketone (Preparation A3) and 2.2 g. of lithium aluminum hydride according to the procedure described above in Preparation B1, affording 10 g., b.p. 148°–150°C. (0.01 mm.).

By replacing the 2-(3,4-methylenedioxyphenyl)vinyl 1-ethylcyclopropyl ketone in Preparation B1 above by a molar equivalent amount of 2-(3,4-methylenedioxyphenyl)vinyl 1-isopropylcyclopropyl ketone, 2-(3,4-methylenedioxyphenyl)vinyl 1-butylcyclopropyl ketone, 2-(4-chlorophenyl)vinyl 1-ethylcyclopropyl ketone, 2-(p-tolyl)vinyl 1-ethylcyclopropyl ketone, 2-(3,4-dichlorophenyl)vinyl cyclopropyl ketone, 2(2,4-dichlorophenyl)-vinyl 1-ethylcyclopropyl ketone, 2-(4-bromophenyl)vinyl 1-ethylcyclopropyl ketone, 2-(4-fluorophenyl)vinyl 1-ethylcyclopropyl ketone, 2-(4-trifluoromethoxyphenyl)vinyl 1-ethylcyclopropyl ketone or 2-(4-tifluoromethylphenyl)vinyl 1-ethylcyclopropyl ketone there can be obtained, respectively, 2-(3,4-methylenedioxyphenyl)ethyl 1-isopropylcyclopropyl carbinol [IV; Ar is 3,4-methylenedioxyphenyl, R is $(CH_3)_2CH$], 2-(3,4-methylenedioxyphenyl)ethyl 1-butylcyclopropyl carbinol [IV; Ar is 3,4-methylenedioxyphenyl, R is $CH_3CH_2CH_2CH_2$], 2-(4-chlorophenyl)ethyl 1-ethylcyclopropyl carbinol [IV; Ar is 4-$ClC_6H_4$, R is $C_2H_5$], 2-(p-tolyl)-ethyl 1-ethylcyclopropyl carbinol [IV; Ar is 4-$CH_3C_6H_4$, R is $C_2H_5$], 2-(3,4-dichlorophenyl)ethyl 1-ethylcyclopropyl carbinol [ IV; Ar is 3,4-$Cl_2C_6H_3$, R is $C_2H_5$], 2-(2,4-dichlorophenyl)ethyl 1-ethylcyclopropyl carbinol [IV; Ar is 2,4-$Cl_2C_6H_3$, R is $C_2H_5$], 2-(4-bromophenyl)ethyl 1-ethylcyclopropyl carbinol [IV; Ar is 4-$BrC_6H_4$, R is $C_2H_5$], 2-(4-fluorophenyl)ethyl 1-ethylcyclopropyl carbinol [IV; Ar is 4-$FC_6H_4$, R is $C_2H_5$], 2-(4-trifluoromethoxyphenyl)ethyl 1-ethylcyclopropyl carbinol [IV; Ar is 4-$F_3COC_6H_4$, R is $C_2H_5$], or 2-(4-trifluoromethylphenyl)ethyl 1-ethylcyclopropyl carbinol [IV; Ar is 4-$F_3CC_6H_4$, R is $C_2H_5$].

C. Arylalkenyl bromides (V)

C1. 3-Ethyl-6-(3,4-methylenedioxyphenyl)-3-hexenyl bromide [V; Ar is 3,4-methylenedioxyphenyl, R is $C_2H_5$].

To a solution of 26.4 g. (0.106 mole) of 2-3,4-methylenedioxyphenyl)ethyl 1-ethylcyclopropyl carbinol in 250 ml. of ether, cooled to −30°C. under nitrogen, was added 18 ml. of collidine. Lithium bromide (26 g., 0.3 mole) was then added, the mixture cooled to −50°C. and 25 g. (0.09 mole) of phosphorus tribromide was added dropwise. The reaction mixture was stirred at −50°C. for 10 minutes, allowed to warm to 0°C. over a 3 hour period and stirred at 0°C. for 3 hours. Collidine (30 ml.) was added, followed by 10 ml. of water. The reaction mixture was partitioned between water and ether, the ether layer washed with water and sodium chloride solution, and dried over anhydrous magnesium sulfate. The ether solution was concentrated to give an oily product used directly in the following reaction.

The latter product was dissolved in about 200 ml. of anhydrous ether and added in a fine stream to a stirred mixture of 27 g. of zinc bromide in 200 ml. of ether held at −30° to −35°C. The mixture was stirred, then allowed to warm to 0°C. during 2 hours, held there for 30 minutes, and then allowed to warm to room temperature over a 3 hour period and stirred for 2 hours longer. The reaction mixtures was partitioned between ether and aqueous sodium chloride. The ether layer was washed three times with 500 ml. of water, then with sodium chloride solution, dried over anhydrous magnesium sulfate and concentrated to remove the solvent. The residue was redissolved in ether, washed with dilute aqueous sodium bicarbonate and with sodium chloride solution, and evaporated to give 23 g. of 3-ethyl-6-(3,4-methylenedioxyphenyl)-3-hexenyl bromide as a straw-colored oil.

C2. 3-Methyl-6-(3,4-methylenedioxyphenyl)-3-hexenyl bromide [V; Ar is 3,4-methylenedioxyphenyl, R is $CH_3$] was prepared from 17.6 g. of 2-(3,4-methylenedioxyphenyl)ethyl 1-methylcyclopropyl carbinol (Preparation B2), 20.3 g. of phosphorus tribromide, 18.5 g. of lithium bromide and 21 g. of zinc bromide according to the procedure given above in Preparation C1, affording 19 g. of product as an oil.

C3. 3-Ethyl-6-(3,4-dimethoxyphenyl)-3-hexenyl bromide [V; Ar is 3,4-$(CH_3O)_2C_6H_3$, R is $C_2H_5$] was prepared from 16 g. of 2-(3,4-dimethoxyphenyl)ethyl 1-ethylcyclopropyl carbinol (Preparation B3), 16.8 g. of phosphorus tribromide, 16.8 g. of lithium bromide and 17.6 g. of zinc bromide according to the procedure given above in Preparation C1. The product was used directly in the succeeding step (Preparation D3) without isolation.

By replacing the 2-(3,4-methylenedioxyphenyl)ethyl 1-ethylcyclopropyl carbinol in Preparation C1 by a molar eqivalent amount of 2-(3,4-methylenedioxyphenyl)ethyl 1-isopropylcyclopropyl carbinol, 2-(3,4-methylenedioxyphenyl)-ethyl 1-butylcyclopropyl carbinol, 2-(4-chlorophenyl)ethyl 1-ethylcyclopropyl carbinol, 2-(p-tolyl)ethyl 1-ethylcyclopropyl carbinol, 2-(3,4-dichlorophenyl)ethyl 1-ethylcyclopropyl carbinol, 2-(2,4-dichlorophenyl)ethyl 1-ethylcyclopropyl carbinol, 2-(4-bromophenyl)ethyl 1-ethylcyclopropyl carbinol, 2-(4-fluorophenyl)ethyl 1-ethylcyclopropyl carbinol, 2-(4-trifluoromethoxyphenyl)ethyl 1-ethylcyclopropyl carbinol or 2-(4-trifluoromethylphenyl)ethyl 1-ethylcyclopropyl carbinol there can be obtained, respectively, 3-isopropyl-6-(3,4-methylenedioxyphenyl)- 3-hexenyl bromide [V; Ar is 3,4-methylenedioxphenyl, R is $(CH_3)_2CH$], 3-butyl-6-(3,4-methylenedioxyphenyl)-3-hexenyl bromide [V; Ar is 3,4-methylenedioxyphenyl, R is $CH_3CH_2CH_2CH_2$], 3-ethyl-6-(4-chlorophenyl)-3-hexenyl bromide [V; Ar is 4-$ClC_6H_4$, R is $C_2H_5$], 3-ethyl-6-(p-tolyl)-3-hexenyl bromide [V; Ar is 4$CH_3C_6H_4$, R is $C_2H_5$], 3-ethyl-6-(3,4-dichlorophenyl)-3-hexenyl bromide [V; Ar is 3,4-$Cl_2C_6H_3$, R is $C_2H_5$], 3-ethyl-6-(2,4-dichlorophenyl)-3-hexenyl bromide [V; Ar is 2,4-$Cl_2C_6H_3$, R is $C_2H_5$], 3-ethyl-6-(4-bromophenyl)-3-hexenyl bromide [V; Ar is 4-$BrC_6H_4$, R is $C_2H_5$], 3-ethyl-6-(4-fluorophenyl)-3-hexenyl bromide [V; Ar is 4-$FC_6H_4$, R is $C_2H_5$]3-ethyl-6-(4-trifluoromethoxyphenyl)-3-hexenyl bromide [V; Ar is 4-$F_3COC_6H_4$, R is $C_2H_5$], or 3-ethyl-6-(4-trifluoromethylphenyl)-3-hexenyl bromide [V; Ar is 4-$F_3CC_6H_4$, R is $C_2H_5$].

D. Arylalkenyl iodides (VI)

D1. 3-Ethyl-6-(3,4-methylenedioxyphenyl)-3-hexenyl iodide [VI; Ar is 3,4-methylenedioxyphenyl, R is $C_2H_5$].

A mixture of 23 g. of 3-ethyl-6-(3,4-methylenedioxyphenyl)-3-hexenyl bromide (Preparation C1) and 30 g. of powdered potassium iodide in 250 ml. of dimethylformamide was stirred for about 16 hours. The reaction mixture was concentrated to remove the solvent and the residue partitioned between cyclohexane and water. The cyclohexane layer was separated, dried over anhydrous magnesium sulfate and evaporated to give 33.0 g. of 3-ethyl-6-(3,4-methylenedioxyphenyl)-3-hexenyl iodide as a light yellow oil.

D2. 3-Methyl-6-(3,4-methylenedioxyphenyl)-3-hexenyl iodide [VI; Ar is 3,4-methylenedioxyphenyl, R is $CH_3$] was prepared from 19.0 g. of 3-methyl-6-(3,4-methylenedioxyphenyl)-3-hexenyl bromide (Preparation C2) and 10.5 g. of sodium iodide in 125 ml. of acetone, to give 21 g. of product as a yellow oil.

D3. 3-Ethyl-6-(3,4-dimethoxyphenyl)-3-hexenyl iodide [VI; Ar is 3,4-$(CH_3O)_2C_6H_3$, R is $C_2H_5$] was prepared from 13.8 g. of 3-ethyl-6-(3,4-dimethoxyphenyl)-3-hexenyl bromide (Preparation C3) and 9 g. of sodium iodide in 120 ml. of acetone, to give 15 g. of product as an oil.

By similar procedures 3-isopropyl-6-(3,4-methylenedioxyphenyl)-3-hexenyl bromide, 3-butyl-6-(3,4-methylenedioxyphenyl)-3-hexenyl bromide, 3-ethyl-6-(4-chlorophenyl)-3-hexenyl bromide, 3-ethyl-6-(p-tolyl)-3-hexenyl bromide, 3-ethyl-6-(3,4-dichlorophenyl)-3-hexenyl bromide, 3-ethyl-6-(2,4-dichlorophenyl)-3-hexenyl bromide, 3-ethyl-6-(4-bromophenyl)-3-hexenyl bromide, 3-ethyl-6-(4-fluorophenyl)-3-hexenyl bromide, 3-ethyl-6-(4-trifluoromethoxyphenyl)-3-hexenyl bromide, or 3-ethyl-6-(4-trifluoromethylphenyl)-3-hexenyl bromide can be caused to react with sodium iodide to give, repsectively, 3-isopropyl-6-(3,4-methylenedioxyphenyl)-3-hexenyl iodide [VI; Ar is 3,4-methylenedioxyphenyl, R is $(CH_3)_2CH$], 3-butyl-6-(3,4-methylenedioxyphenyl)-3-hexenyl iodide [VI; Ar is 3,4-methylenedioxyphenyl, R is $CH_3CH_2CH_2CH_2$], 3-ethyl-6-(4-chlorophenyl)-3-hexenyl iodide [VI; Ar is 4-$ClC_6H_4$, R is $C_2H_5$]; 3-ethyl-6-(p-tolyl)-3 -hexenyl iodide [VI; Ar is 4-CH$_3$C$_6$H$_4$, R is C$_2$H$_5$], 6-(3,4-dichlorophenyl)-3-hexenyl iodide [VI; Ar is 3,4-Cl$_2$C$_6$H$_3$, R is C$_2$H$_5$], 6-(2,4-dichlorophenyl)-3-hexenyl iodide [VI; is 2,4-Cl$_2$C$_6$H$_3$, R is C$_2$H$_5$], 6-(4-bromophenyl)-3-hexenyl iodide [VI; Ar is 4-BrC$_6$H$_4$, R is C$_2$H$_5$], 6-(4-fluorophenyl)-3-hexenyl iodide [VI; Ar is 4-FC$_6$H$_4$, R is C$_2$H$_5$], 6-(4-trifluoromethoxyphenyl)-3-hexenyl iodide [VI; Ar is F$_3$COC$_6$H$_4$, R is C$_2$H$_5$], or 6-(4-trifluoromethyl)-3-hexenyl iodide [VI; Ar is 4-F$_3$CC$_6$H$_4$, R is C$_2$H$_5$].

EXAMPLE 1

4-Ethyl-7-(3,4-methylenedioxyphenyl)-4-heptenenitrile [IA; Ar is 3,4-methylenedioxyphenyl, R is C$_2$H$_5$]

A mixture of 12.0 g. (0.0333 mole) of 3-ethyl-6-(3,4-methylenedioxyphenyl)-3-hexenyl iodide (Preparation D1), 4.3 g. (0.067 mole) of potassium cyanide, 80 ml. of 95% ethanol and 10 ml. of water was heated to 60°C. and held between 50 and 60°C. for 12 hours. The reaction mixture was heated at reflux for 1 hour and then concentrated in vacuo. The residue was partitioned between water and ether, and the ether solution was dried over anhydrous magnesium sulfate and concentrated. The residue (11.5 g. of yelllow oil) was chromatographed on a column of 280 g. of silica gel, and the column was eluted with pentane and with pentane containing increasing amounts of benzene. The fractions brought out by 80% benzene were collected and distilled at 155°C. (0.005 mm.) to give 3.5 g. of 4-ethyl-7-(3,4methylenedioxyphenyl)-4-heptenenitrile as a colorless oil, n$_D^{27}$ = 1.5302.

Anal. Calcd. for C$_{16}$H$_{19}$NO$_2$: C, 74.68; H, 7.44; N, 5.44.

Found: C, 74.36, H, 7.48; N, 5.29.

Infrared (IR) (oil film) λ $_\mu$ $^{max}$ 3.45mss + shldrs. (CH); 4.48m (C ≡ N), 5.42wm, 5.85wm; 6.26m, 6.68s, 6.74s, 6.96s (aromatic + CH). Nuclear Magnetic Resonance (NMR) [20% CDCl$_3$, internal tetramethylsilane (TMS)] δ ppm (Ratio) 6.63(3) (arom); 5.85(2) (—O—CH$_2$—O); 5.20(1) (=CH); 1.65–3.00(10) (CH$_2$ × 5); 0.90(3) (Me triplet).

4-Ethyl-7-(3,4-methylenedioxyphenyl)-4-heptenenitrile was found to have pesticidal activity when tested against dock beetle larvae at a concentration of 20 micrograms per insect, against yellow fever mosquito larvae at 1 ppm. in water and against rhodnius prolixus nymph at 100 micrograms per insect.

By replacing the 3-ethyl-6-(3,4-methylenedioxyphenyl)-3-hexenyl iodide in the foregoing preparation by a molar equivalent amount of 3-isopropyl-6-(3,4-methylenedioxyphenyl)-3-hexenyl iodide, 3-butyl-6-(3,4-methylenedioxyphenyl)-3-hexenyl iodide, 3-ethyl-6-(4-chlorophenyl)-3-hexenyl iodide, 3-ethyl-6-(p-tolyl)-3-hexenyl iodide, 6-(3,4-dichlorophenyl)-3-hexenyl iodide, 6-(2,4-dichlorophenyl)-3-hexenyl iodide, 6-(4-bromophenyl)-3-hexenyl iodide, 6-(4-fluorophenyl)-3-hexenyl iodide, 6-(4-trifluoromethoxyphenyl)-3-hexenyl iodide, or 6-(4-trifluoromethylphenyl)-3-hexenyl iodide there can be obtained, respectively, 4-isopropyl-7-(3,4-methylenedioxyphenyl)-4-heptenenitrile [IA; Ar is 3,4-methylenedioxyphenyl, R is (CH$_3$)$_2$CH], 4-butyl-7-(3,4-methylenedioxyphenyl)-4-heptenenitrile [IA; Ar is 3,4-methylenedioxyphenyl, R is CH$_3$CH$_2$CH$_2$CH$_2$], 4-ethyl-7-(4-chlorophenyl)-4-heptenenitrile [IA; Ar is 4-ClC$_6$H$_4$, R is C$_2$H$_5$], 4-ethyl-7-(p-tolyl)-4-heptenenitrile [ IA; Ar is 4-CH$_3$C$_6$H$_4$, R is C$_2$H$_5$], 4-ethyl-7-(3,4-dichlorophenyl)-4-heptenenitrile [IA; Ar is 3,4-Cl$_2$C$_6$H$_3$, R is C$_2$H$_5$], 4-ethyl-7-(2,4-dichlorophenyl)-4-heptenenitrile [IA; Ar is 2,4-Cl$_2$C$_6$H$_3$, R is C$_2$H$_5$], 4-ethyl-7-(4-bromophenyl)-4-heptenenitrile [IA; Ar is 4-BrC$_6$H$_4$, R is C$_2$H$_5$], 4-ethyl-7-(4-fluorophenyl)-4-heptenenitrile [IA; Ar is 4-FC$_6$H$_4$, R is C$_2$H$_5$], 4-ethyl-7-(4-trifluoromethoxyphenyl)-4-heptenenitrile [IA; Ar is 4-F$_3$COC$_6$H$_4$, R is C$_2$H$_5$], or 4-ethyl-7-(4-trifluoromethylphenyl)-4-heptenitrile [IA; Ar is 4-F$_3$CC$_6$H$_4$, R is C$_2$H$_5$].

EXAMPLE 2

4-Ethyl-7-(3,4-methylenedioxyphenyl)-4-heptenoic acid [IB; Ar is 3,4-methylenedioxyphenyl, R is C$_2$H$_5$].

A mixture of 10.6 g. (0.041 mole) of 4-ethyl-7-(3,4-methylenedioxyphenyl)-4-heptenenitrile (Example 1), 8.8 g. (0.157 mole) of potassium hydroxide, 80 ml. of absolute ethanol and 40 ml. of water was stirred at reflux for 5 hours. The reaction mixture was concentrated in vacuo and the residue partitioned between water and ether. The ether solution was dried over anhydrous magnesium sulfate and concentrated. The residue was crystallized from pentane to give 1.3 g. of 4-ethyl-7-(3,4-methylenedioxyphenyl)-4-heptenamide (see Example 3 below). The aqueous alkaline solution was acidified with 50 ml. of 5N hydrochloric acid and extracted with ether. The ether extracts were dried and concentrated, and the residue (7.0 g., m.p. 60°–62°C.) was recrystallized from pentane to give 4.5 g. of 4-ethyl-7-(3,4-methylenedioxyphenyl)-4-heptenoic acid, colorless crystals, m.p. 69°–70°C.

Anal. Calcd. for C$_{16}$H$_{20}$O$_4$: C, 69.53; H, 7.29.

Found: C, 69.55; H, 7.38.

IR (1/2% KBr) λ $_\mu$ $^{max}$ 3.40mss, 3.45ms + shldrs. 3.25, 3.70–4.50, (CH, v.s. H-bonding); 5.87s (C=O); 6.02 shldr., 6.25w, 6.65ms, 6.73ms, 6.95msns (unsatn. + CH).

4-Ethyl-7-(3,4-methylenedioxyphenyl)-4-heptenoic acid was found to be pesticidal against dock beetle eggs at a concentration of 100 ppm.

By replacing the 4-ethyl-7-(3,4-methylenedioxyphenyl)-4-heptenenitrile in Example 2 by a molar equivalent amount of 4-isopropyl-7-(3,4-methylenedioxyphenyl)-4-heptenenitrile, 4-butyl-7-(3,4-methylenedioxyphenyl)-4-heptenenitrile, 4-ethyl-7-(4-chlorophenyl)-4-heptenenitrile, 4-ethyl-7-(p-tolyl)-4-heptenenitrile, 4-ethyl-7-(3,4-dichlorophenyl)-4-heptenenitrile, 4-ethyl-7-(2,4-dichlorophenyl)-4-heptenenitrile, 4-ethyl-7-(4-bromophenyl)-4-heptenenitrile, 4-ethyl-7-(4-fluorophenyl)-4-heptenenitrile, 4-ethyl-7-(4-trifluoromethoxyphenyl)-4-heptenenitrile or 4-ethyl-7-(4-trifluoromethylphenyl)-4-heptenenitrile there can be obtained, respectively, 4-isopropyl-7-(3,4-methylenedioxyphenyl)-4-heptenoic acid [IB; Ar is 3,4-methylenedioxyphenyl, R is (CH$_3$)$_2$CH], 4-butyl-7-(3,4-methylenedioxyphenyl)-4-heptenoic acid [IB; Ar is 3,4-methylenedioxyphenyl, R is CH$_3$CH$_2$CH$_2$CH$_2$], 4-ethyl-7-(4-chlorophenyl)-4-heptenoic acid [IB; Ar is 4-ClC$_6$H$_4$, R is C$_2$H$_5$], 4-ethyl-7-(p-tolyl)-4-heptenoic acid [IB; Ar is 4-CH$_3$C$_6$H$_4$, R is C$_2$H$_5$], 4-ethyl-7-(3,4-dichlorophenyl)-4-heptenoic acid [IB; Ar is 3,4-Cl$_2$C$_6$H$_3$, R is C$_2$H$_5$], 4-ethyl-7-(2,4-dichlorophenyl)-4-heptenoic acid [IB; Ar is 2,4-Cl$_2$C$_6$H$_3$, R is C$_2$H$_5$], 4-ethyl-7-(4-bromophenyl)-4- heptenoic acid [IB; Ar is 4-BrC$_6$H$_4$, R is C$_2$H$_5$], 4-ethyl-7-(4-fluorophenyl)-4-heptenoic acid [IB; Ar is 4-FC$_6$H$_4$, R is C$_2$H$_5$], 4-ethyl-7-(4-trifluoromethoxyphenyl)-4-heptenoic acid [IB; Ar is 4-F$_3$COC$_6$H$_4$, R is C$_2$H$_5$], or 4-ethyl-7-(4-trifluoromethylphenyl)-4-heptenoic acid [IB; Ar is 4-F$_3$CC$_6$H$_4$, R is C$_2$H$_5$].

EXAMPLE 3

4-Ethyl-7-(3,4-methylenedioxyphenyl)-4-heptenamide [IC; Ar is 3,4-methylenedioxyphenyl, R is C$_2$H$_5$].

A mixture of 12 g. (0.0468 mole) of 4-ethyl-7-(3,4-methylenedioxyphenyl)-4-heptenenitrile (Example 1), 14 ml. (0.12 mole) of 30% aqueous hydrogen peroxide, 14 ml. of 6N aqueous sodium hydroxide and 40 ml. of 95% ethanol was warmed at 50°C. for 90 minutes. The reaction mixture was held at room temperature for about 16 hours and then warmed again with 4 ml. of additional hydrogen peroxide solution. The mixture was concentrated in vacuo and partitioned between water and ether. The ether solution was dried over anhydrous magnesium sulfate, dried and concentrated. The residue was crystallized from pentane and recrystallized from a pentane-ether mixture to give 5 g. of 4-ethyl-7-(3,4-methylenedioxyphenyl)-4-hepteneamide, colorless crystals, m.p. 91°–92°C.

Anal. Calcd. for C$_{16}$H$_{21}$NO$_3$: C, 69.79; H, 7.69. Found: C, 69.92; H, 7.76.

IR (1/2% KBr) $\lambda$ $\mu$ $^{max}$ 2.96m, 3.16m (NH$_2$); 3.40–3.53m + shldr. (CH); 6.08s + shldrs., 6.67mss, 6.67mss, 6.74ms, 6.95ms (H$_2$N—C=O, arom + CH). NMR (20% CDCl$_3$, internal TMS) $\delta$ppm (Ratio) 6.72(3) (arom); 5.92(4) (NH$_3$+ O—CH$_2$—O); 5.20(1) (=CH); 1.7–2.8(10) (CH$_2\times$ 5); 0.92(3) (Me triplet).

4-Ethyl-7-(3,4-methylenedioxyphenyl)-4-heptenamide was found to have a minium inhibitory concentration in vitro of about 12 micrograms per milliliter against equine rhino virus.

By replacing the 4-ethyl-7-(3,4-methylenedioxyphenyl)-4-heptenenitrile in Example 3 by a molar equivalent amount of 4-isopropyl-7-(3,4-methylenedioxyphenyl)-4-heptenenitrile, 4-butyl-7-(3,4-methylenedioxyphenyl)-4-heptenenitrile, 4-ethyl-7(4-chlorophenyl)-4heptenenitrile, 4-ethyl-7-(p-tolyl)-4-heptenenitrile, 4-ethyl-7-(3,4-dichlorophenyl)-4-heptenenitrile, 4-ethyl-7-(2,4-dichlorophenyl)-4-heptenenitrile, 4-ethyl-7-(4-bromophenyl)-4-heptenenitrile, 4-ethyl-7-(4-fluorophenyl)-4-heptenenitrile, 4-ethyl-7(4-trifluoromethoxyphenyl)-4-heptenenitrile or 4-ethyl-7-(4-trifluoromethylphenyl)-4-heptenenitrile there can be obtained, respectively 4-isopropyl-7-(3,4-methylenedioxyphenyl)-4-heptenamide [IC; Ar is 3,4-methylenedioxyphenyl, R is (CH$_3$)$_2$CH], 4-butyl-7-(3,4-methylenedioxyphenyl)-4-heptenamide [IC; Ar is 3,4-methylenedioxyphenyl, R is CH$_3$CH$_2$CH$_2$CH$_2$], 4-ethyl-7-(4-chlorophenyl)-4-heptenamide [IC; Ar is 4-ClC$_6$H$_4$, R is C$_2$H$_5$], 4-ethyl-7-(p-tolyl)-4-heptenamide [IC; Ar is 4-CH$_3$C$_6$H$_4$, R is C$_2$H$_5$], 4-ethyl-7-(3,4-dichlorophenyl)-4-heptenamide [IC; Ar is 3,4-Cl$_2$C$_6$H$_3$, R is C$_2$H$_5$], 4-ethyl-7-(2,4-dichlorophenyl)-4-heptenamide [IC; Ar is 2,4-Cl$_2$C$_6$H$_3$, R is C$_2$H$_5$], 4-ethyl-7-(4-bromophenyl)-4-heptenamide [IC; Ar is 4-BrC$_6$H$_4$, R is C$_2$H$_5$], 4-ethyl-7-(4-fluorophenyl)-4-heptenamide [IC; Ar is 4-FC$_6$H$_4$, R is C$_2$H$_5$], 4-ethyl-7-(4-trifluoromethoxyphenyl)-4-heptenamide [IC; Ar is 4-F$_3$COC$_6$H$_4$, R is C$_2$H$_5$], or 4-ethyl-7-(4-trifluoromethylphenyl)-4-heptenamide [IC; Ar is 4-F$_3$CC$_6$H$_4$, R is C$_2$H$_5$].

EXAMPLE 4

4-Ethyl-7-(3,4-methylenedioxyphenyl)-4-heptenylamine [ID; Ar is 3,4-methylenedioxyphenyl, R is C$_2$H$_5$].

Sodium borohydride (19 g., 0.5 mole) was added over a period of 40 minutes to a solution of 17.5 g. (0.05 mole) of 4-ethyl-7-(3,4-methylenedioxyphenyl)-4-heptenenitrile (Example 1) and 28.8 g. of cobaltous chloride hexanhydrate in 400 ml. of anhydrous methanol held at 10°–15°C. The reaction mixture was stirred at 20°C. for 1 hour and then treated with 300 ml. of 3N hydrochloric acid. The mixture was filtered, concentrated to a volume of 300 ml., cooled and made basic with ammonium hydroxide. The latter mixture was extracted with methylene dichloride and the methylene dichloride extracts dried over anydrous magnesium sulfate and concentrated to give 18.0 g. of 4-ethyl-7-(3,4-methylenedioxyphenyl)-4-heptenylamine as an oil.

By replacing the 4-ethyl-7-(3,4-methylenedioxyphenyl)-4-heptenenitrile in Example 4 by a molar equivalent amount of 4-isopropyl-7-(3,4-methylenedioxyphenyl)-4-heptenenitrile, 4-butyl-7-(3,4-methylenedioxyphenyl)-4-heptenenitrile, 4-ethyl-7-(4-chlorophenyl)-4-heptenenitrile, 4-ethyl-7-(p-tolyl)-4-heptenenitrile, 4-ethyl-7-(3,4-dichlorophenyl)-4-heptenenitrile, 4-ethyl-7-(2,4dichlorophenyl)-4-heptenenitrile, 4-ethyl-7-(4-bromophenyl)-4-heptenenitrile, 4-ethyl-7-(4-fluorophenyl)-4-heptenenitrile, 4-ethyl-7-(4-trifluoromethoxyphenyl)-4-heptenenitirle or 4-ethyl-7-(4-trifluoromethylphenyl)-4-heptenenitrile there can be obtained, respectively, 4-isopropyl-7-(3,4-methylenedioxyphenyl)-4-heptenylamine [ID; Ar is 3,4-methylenedioxyphenyl, R is (CH$_3$)$_2$CH], 4-butyl-7-(3,4-methylenedioxyphenyl)- 4-heptenylamine [ID; Ar is 3,4-methylenedioxyphenyl, R is CH$_3$CH$_2$CH$_2$CH$_2$], 4-ethyl-7-(4-chlorophenyl)-4-heptenylamine [ID; Ar is 4-ClC$_6$H$_4$, R is C$_2$H$_5$], 4-ethyl-7-(p-tolyl)-4-heptenylamine [ID; Ar is 4-CH$_3$C$_6$-H$_4$, R is C$_2$H$_5$], 4-ethyl-7-(3,4-dichlorophenyl)-4-heptenylamine [ID; Ar is 3,4-Cl$_2$C$_6$H$_3$, R is C$_2$H$_5$], 4-ethyl-7-(2,4-dichlorophenyl)-4-heptenylamine [ID; Ar is 2,4-Cl$_2$C$_6$H$_3$, R is C$_2$H$_5$], 4-ethyl-7-(4-bromophenyl)-4-heptenylamine [ID; Ar is 4-BrC$_6$H$_4$, R is C$_2$H$_5$], 4-ethyl-7-(4-fluorophenyl)-4-heptenylamine [ID; Ar is 4-FC$_6$H$_4$, R is C$_2$H$_5$], 4-ethyl-7-(4-trifluoromethoxyphenyl)-4-heptenylamine [ID; Ar is 4-F$_3$COC$_6$H$_4$, R is C$_2$H$_5$], or 4-ethyl-7-(4-trifluoromethylphenyl)-4-heptenylamine [ID; Ar is 4-F$_3$CC$_6$H$_4$, R is C$_2$H$_5$].

EXAMPLE 5

N-[4-Ethyl-7-(3,4-methylenedioxyphenyl)-4-heptenyl]-p-anisamide [IE; Ar is 3,4-methylenedioxyphenyl, R is C$_2$H$_5$, Ar' is 4-CH$_3$OC$_6$H$_4$].

To a solution of 13 g. (0.05 mole) of 4-ethyl-7-(3,4-methylenedioxyphenyl)-4-heptenylamine (Example 4) in 50 ml. of chloroform containing 5 g. (0.05 mole) of triethylamine was added dropwise 8.5 g. (0.05 mole) of p-anisoyl chloride with external cooling and in a nitrogen atmosphere. The reaction mixture was stirred at room temperature for about 16 hours, diluted with 200 ml. of chloroform, washed with water, dried and concenrated in vacuo. The residue (20 g. of oil) was chromatographed twice on silica gel. The first chromatograph column was eluted with the pentane-benzene-methylene dichloride solvent sequence, and the second column was eluted with the petane-benzene-ethyl acetate solvent sequence, from which benzene-ethyl acetate 9:1 brought out the product, 3 g. of N-[4-ethyl-7-(3,4-methylenedioxyphenyl)-4-heptenyl]-p-anisamide as a viscous oil.

Anal. Calcd. for $C_{24}H_{29}NO_4$: C, 72.89; H, 7.39; N 3.54.

Found: C, 72.69; H, 7.46: N, 3.46.

IR (oil film) $\lambda_\mu^{max}$ 3.03m (NH); 3.45mss + shldrs. (CH) 6.15mss, 6.25mss, 6.67s + shldr., 6.59mss (C=O—N, unsat., arom + CH) 6.48ms (=NH).

NMR (20% $CDCl_3$, internal TMS) δppm (Ratio) 7.75(2), 6.85(3) (arom. $A_2B_2$ + C=ONH); 6.63(3) (arom); 5.85(2) (O—$CH_2$—O); 5.13(1) (=CH); 3.78(3) (OMe), 3.37(2) ($Ch_2$—N); 1.15–2.75(10) (5×$CH_2$); 0.92(3) (Me triplet).

N-[4-Ethyl-7-(3,4-methylenedioxyphenyl)-4-heptenyl]-p-anisamide was pesticidal against dock beetle eggs, 75% mortality at 5 ppm.

EXAMPLE 6

N-[4-Ethyl-7-(3,4-methylenedioxyphenyl)-4-heptenyl[-p-trifluoromethoxybenzamide

[IE; Ar is 3,4-methylenedioxyphenyl, R is $C_2H_5$, Ar' is 4-$F_3COC_6H_4$] was prepared from 13 g. of 4-ethyl-7-(3,4-methylenedioxyphenyl)-4-heptenylamine (Example 4) and 11.2 g. of p-trifluoromethoxybenzoyl chloride according to the procedure of Example 5. The product was chromatographed twice on silica gel and eluted with the pentane-benzene-ethyl acetate solvent sequence. Benzene-ethyl acetate 8:2 brought out the desired product, 9.5 g. of N-[4-ethyl-7-(3,4-methylenedioxyphenyl)-4-heptenyl]-p-trifluoromethoxybenzamide as a colorless oil.

Anal. Calcd. for $C_{24}H_{26}F_3NO_4$: C, 64.13; H, 5.83; N, 3.12.

Found: C, 64.74; H, 6.02; N, 2.88.

IR (melt) $\lambda_\mu^{max}$ 3.03 ms (NH); 3.45ms + shldrs. (CH); 6.05–6.12s, 6.25m, 6.32wm, 6.90–7.00s (C=O—N, unsat. arom CH); 6.52ms (NH). NMR (20% $CDCl_3$, internal TMS) δppm (Ratio) 7.82(2), 7.2 (2 ) (arom $A_2B_2$); 6.63(4) (arom +C=ONH); 5.85(2) (O—$CH_2$—O); 5.13(1) (=CH—), 3.35(2) N—$CH_2$; 1.15–2.75(10) ($CH_2$ × 5); 0.90(30) (Me triplet).

N-[4-Ethyl-7-(3,4-methylenedioxyphenyl)-4-heptenyl]-p-trifluoromethoxybenzamide was pesticidal against dock beetle larvae at 5 micrograms per insect.

By replacing the 4-ethyl-7-(3,4-methylenedioxyphenyl)-4-heptenylamine in Example 5 by a molar equivalent amount of 4-isopropyl-7-(3,4-methylenedioxyphenyl)-4-heptenylamine, 4-butyl-7-(3,4-methylenedioxyphenyl)-4-heptenylamine, 4-ethyl-7-(4-chlorophenyl)-4-heptenylamine, 4-ethyl-7-(p-tolyl)-4-ethyl-7-(3,4-dichlorophenyl)-4-heptenylamine, 4-ethyl-7-(2,4-dichlorophenyl)-4-heptenylamine, 4-ethyl-7-(4-bromophenyl)-4-heptenylamine, 4-ethyl-7-(4-fluorophenyl)-4-heptenylamine, 4-ethyl-7-(4-trifluoromethoxyphenyl)-4-heptenylamine or 4-ethyl-7-(4-trifluoromethylphenyl)-4-heptenylamine there can be obtained, respectively, N-[4-isopropyl-7-(3,4-methylenedioxyphenyl)-4-heptenyl]-p-ansiamide [IE; Ar is 3,4-methylenedioxyphenyl, R is $(CH_3)_2CH$, Ar' is 4-$CH_3OC_6H_4$], N-[4-butyl-7-(3,4-methylenedioxyphenyl)-4-heptenyl]-p-ansamide [IE; Ar is 3,4-methylenedioxyphenyl, R is $CH_3CH_2CH_2CH_2$, Ar' is 4-$CH_3OC_6H_4$], N-[4-ethyl-7-(4-chlorophenyl)-4-heptenyl]-p-anisamide [IE; Ar is 4-$ClC_6H_4$, R is $C_2H_5$, Ar' is 4-$CH_3OC_6H_4$], N-(4-ethyl-7-(p-tolyl)-4-heptenyl]-p-anisamide [IE; Ar is 4-$CH_3C_6H_4$, R is $C_2H_5$, Ar' is 4-$CH_3OC_6H_4$], N-[4-ethyl-7-(3,4-dichlorophenyl)-4 -heptenyl]-p-anisamide [IE; Ar is s3,4-$Cl_2C_6H_4$, R is $C_2H_5$, Ar' is 4-$CH_3OC_6H_4$], N-[4-ethyl-7-(2,4-dichlorophenyl)-4-heptenyl]-p-anisamide [IE; Ar is 2,4-$Cl_2C_6H_4$, R is $C_2H_5$, Ar' is 4-$CH_3OC_6H_4$], N-[4-ethyl-7-(4-bromophenyl)-4-heptenyl]-p-ansiamide [IE; Ar is 4-$BrC_6H_4$, R is $C_2H_5$, Ar' is 4-$CH_3OC_6H_4$], N-[4-ethyl-7-(4-fluorophenyl)-4-heptenyl]-p-anisamide [IE; Ar is 4-$FC_6H_4$, R is $C_2H_5$, AR' is 4-$CH_3OC_6H_4$], N-[4-ethyl-7-(4-trifluoromethoxyphenyl)-4-heptenyl]-p-anisamide [IE; Ar is 4-$F_3COC_6H_4$, R is $C_2H_5$, Ar' is 4-$CH_3OC_6H_4$], or N-[4-ethyl-7-(4-trifluoromethylphenyl)-4-heptenyl]-p-anisamide [IE; Ar is 4-$F_3CC_6H_4$, R is $C_2H_5$, Ar' is $CH_3OC_6H_4$].

By replacing the p-anisoyl chloride in Example 5 by a molar equivalent amount of benzoyl chloride, p-chlorobenzoyl chloride, p-tolyl chloride, 3,4-methylenedioxybenzoyl chloride, 3,4-dichlorobenzoyl chloride, p-bromobenzoyl chloride, p-fluorobenzyl choride or p-trifluoromethylbenzoyl chloride there can be obtained, respectively, N-[4-ethyl-7-(3,4-methylenedioxyphenyl)-4-heptenyl]benazamide [IE; Ar is 3,4-methylenedioxyphenyl, R is $C_2H_5$, Ar' is $C_6H_5$], N-[4-ethyl-7-(3,4-methylenedioxyphenyl)-4-heptenyl]-p-chlorobenzamide [IE: Ar is 3,4-methylenedioxyphenyl, R is $C_2H_5$, Ar' is 4-$ClC_6H_4$], N-[4-ethyl-7-(3,4-methylenedioxyphenyl)-4-heptenyl]-p-toluamide [IE: Ar is 3,4-methylenedioxyphenyl, R is $C_2H_5$, Ar' is 4-$CH_3C_6H_4$], N-[4-ethyl-7-(3,4-methylenedioxyphenyl)-4-heptenyl]-3,4-methylenedioxybenzamide [IE; Ar and Ar'are 3,4-methylenedioxyphenyl, R is $C_2H_5$], N-[4-ethyl-7-(3,4-methylenedioxyphenyl)-4-heptenyl]-3,4-dichlorobenzamide [IE; Ar is 3,4-methylenedioxyphenyl, R is $C_2H_5$, Ar' is 3,4-$Cl_2C_6H_3$], N-(4-ethyl-7-(3,4-methylenedioxyphenyl- 4-heptenyl-p-bromobenzamide [IE; Ar is 3,4-methylenedioxyphenyl, R is $C_2H_5$, Ar' is 4-$BrC_6H_4$], N-[4-ethyl-7-(3,4-methylenedioxyphenyl) 4-heptenyl]-p-fluorobenzamide [IE; Ar is 3,4-methylenedioxyphenyl, R is $C_2H_5$, Ar' is 4-$FC_6H_4$], or N-[4-ethyl-7-(3,4-methylenedioxyphenyl)-4-heptenyl]-p-trifluoromethylbenzamide [IE; Ar is 3,4-methylenedioxyphenyl, R is $C_2H_5$, Ar' is 4-$F_3CC_6H_4$].

We claim:

1. A compound of the formula

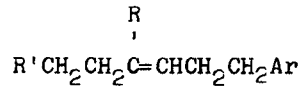

wherein R is lower-alkyl of 1 to 4 carbon atoms; R' is a member of the group consisting of N≡C—, HOOC—, $H_2NCO$—, $H_2NCH_2$— and Ar'CONHCH$_2$—; Ar is 3,4-methylenedioxyphenyl; and Ar' is phenyl or phenyl substituted by 3,4-methylenedioxy or one or two monovalent substitutents selected from the group consisting of lower-alkyl of 1 to 4 carbon atoms, lower-alkoxy of 1 to 4 carbon atoms, halogen, trifluoromethyl and trifluoromethoxy.

2. A compound according to claim 1 wherein R is $C_2H_5$.

3. 4-Ethyl-7-(3,4-methylenedioxyphenyl)-4-heptenenitrile, according to claim 2.

4. 4-Ethyl-7-(3,4-methylenedioxyphenyl)-4-heptenoic acid, according to claim 2.

5. 4-Ethyl-7-(3,4-methylenedioxyphenyl)-4-heptenamide, according to claim 2.

6. N-[4-Ethyl-7-(3,4-methylenedioxyphenyl)-4-heptenyl]-p-anisamide, according to claim 2.

7. N-[4-Ethyl-7-(3,4-methylenedioxyphenyl)-4-heptenyl]-p-trifluoromethoxybenzamide, according to claim 2.

* * * * *